(12) United States Patent   (10) Patent No.: US 7,841,566 B2
Kellerman   (45) Date of Patent: Nov. 30, 2010

(54) DEVICE AND METHOD FOR SUSPENDING AND RETAINING TELECOMMUNICATION AND POWER CABLES WITHIN A BUILDING

(75) Inventor: Dallas Kellerman, Belleville, IL (US)

(73) Assignee: Cablofil, Inc., Mascouth, IL (US)

( * ) Notice: Subject to any disclaimer, the term of this patent is extended or adjusted under 35 U.S.C. 154(b) by 0 days.

(21) Appl. No.: 12/401,158

(22) Filed: Mar. 10, 2009

(65) Prior Publication Data
US 2010/0230551 A1    Sep. 16, 2010

(51) Int. Cl.
*F16L 3/00* (2006.01)
(52) U.S. Cl. ...................................................... 248/49
(58) Field of Classification Search .................. 248/49, 248/53, 68.1, 58; 59/78, 900; 174/158 R
See application file for complete search history.

(56) References Cited

U.S. PATENT DOCUMENTS

| | | | |
|---|---|---|---|
| 6,019,322 A * | 2/2000 | Shimizu | 248/49 |
| 6,637,704 B2 * | 10/2003 | Jette | 248/49 |
| 6,745,555 B2 * | 6/2004 | Hermey et al. | 59/78.1 |
| 7,249,452 B2 * | 7/2007 | Komiya | 59/78.1 |
| 7,428,808 B2 * | 9/2008 | Utaki et al. | 59/78.1 |
| 7,586,036 B2 * | 9/2009 | Davis et al. | 174/40 CC |
| 2002/0030143 A1 * | 3/2002 | Jette | 248/49 |
| 2005/0173596 A1 * | 8/2005 | Herzog | 248/49 |
| 2006/0038091 A1 * | 2/2006 | Winn et al. | 248/49 |

* cited by examiner

*Primary Examiner*—Ramon O Ramirez
(74) *Attorney, Agent, or Firm*—Bryan Cave LLP

(57) ABSTRACT

Devices and methods are provided for suspending and retaining telecommunication cables, power cables, and other items within or outside of a building. The devices generally include a support tray having a bottom plane and top plane, with the tray being adapted to support the article. The tray will include at least one corner area, but may include many separate corner areas. The devices will further include a retention device, which is affixed to or integrally formed with the corner area. The retention device will include at least one protrusion that extends from the corner area into an interior portion of the tray. The retention device and, more specifically, the at least one protrusion will be effective to prevent articles, such as telecommunication cables, power cables, and other items, from being pulled over the corner area of the tray during installation of the cables.

8 Claims, 3 Drawing Sheets

DEVICE AND METHOD FOR SUSPENDING AND RETAINING TELECOMMUNICATION AND POWER CABLES WITHIN A BUILDING

FIELD OF THE INVENTION

The field of the invention relates to devices and methods for supporting, suspending and retaining telecommunication cables, power cables, and other items within a building environment.

BACKGROUND OF THE INVENTION

Telecommunication and power cables are present and used in most, if not all, buildings today—including commercial buildings, residential buildings, and others. Of course, such cables are a necessity to bring power to a building, and enable communication with other parties outside the building. Indeed, they are a basic necessity for any building.

It is generally preferred to locate telecommunication and power cables, or a substantial portion thereof, outside the view of the casual observer. For example, it is commonplace to locate and suspend telecommunication and power cables within the ceiling of a building (or beneath a floor surface), such that the cables may not be readily visible. This serves at least two purposes. First, it reduces the possibility of a particular cable, accidentally or purposely, being damaged or severed. Second, it creates a more aesthetically pleasing environment, when such cables are not readily visible. Importantly, however, these cables must still be readily accessible to maintenance personnel. In other words, the cables should not be contained in a device which prevents easy access to the same by maintenance personnel.

In many cases, telecommunication and power cables have been suspended near the topside of a wall (or beneath a floor surface)—either inside or outside a building. For example, in certain cases, the telecommunication and power cables have been suspended within a ceiling (or other areas) of a building by placing the cables on a tray (or other device) that is positioned within the ceiling and attached to one or more walls. These trays will often be configured to outline the dimensions of a room or multiple rooms, such that the trays will often include several bends and turns. When the telecommunication and power cables are placed in these trays, the cables are often pulled and subjected to other forces that sometimes cause the cables to fall out of the trays. For example, when the telecommunication and power cables are placed in these trays, the cables are often pulled during the installation process, and are often pulled over the corner portions of these trays. This delays and increases the amount of labor (and burden) involved during installation of these cables.

Accordingly, a need exists for improved devices and methods for suspending and locating telecommunication cables, power cables, and other items within a building.

SUMMARY OF THE INVENTION

According to a first aspect of the present invention, devices are provided for supporting, suspending and retaining an article within a building, such as suspending telecommunication cables, power cables, and other items near the topside of a wall in a commercial building (or beneath a floor surface). The devices generally comprise a support tray having a bottom plane and top plane, whereby the tray is adapted to support the article. The tray will include at least one corner area, but may include many separate corner areas. According to these embodiments, the devices will further include a retention device, which is affixed to or integrally formed with the corner area. The retention device will preferably include at least one protrusion which extends from the corner area into an interior portion of the tray. The invention provides that the retention device and, more specifically, the at least one protrusion will be effective to prevent articles, such as telecommunication cables, power cables, and other items, from being pulled over the corner area of the tray during installation.

According to another aspect of the present invention, methods for supporting, suspending and retaining an article are provided. More particularly, methods for supporting, suspending and retaining telecommunication cables, power cables, and other items within a building are provided. Such methods generally comprise attaching a support tray to a wall. The support tray will preferably include a bottom plane, a top plane, and at least one corner area, but may include numerous corner areas. The methods further comprise providing the support tray with a retention device. As described in the embodiment above, the retention device is preferably affixed to or integrally formed with each corner area of the tray, and includes at least one protrusion which extends from the corner area into an interior portion of the tray. The methods further include placing or installing the articles, directly or indirectly, on the tray, whereby the retention device is effective to prevent the articles, such as telecommunication cables, power cables, and other items, from being pulled over the corner area of the tray during installation thereof.

According to additional aspects of the present invention, kits are provided that may be used to construct the devices and/or carry out the methods described herein. The above-mentioned and additional features of the present invention are further illustrated in the Detailed Description contained herein.

DETAILED DESCRIPTION OF THE INVENTION

The following will describe in detail several preferred embodiments of the present. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

According to a first aspect of the present invention, devices are provided for supporting, suspending and retaining an article within a building, such as telecommunication cables, power cables, and other items. The phrase "within a building," and similar phrases, are generally used throughout this specification to refer to the interior portion of a building, such as a location near the topside of an interior wall of a building (or beneath a floor surface). However, the invention provides that, in certain embodiments, the phrase "within a building" will also encompass the exterior portion of a building, such as a location near the topside of an exterior wall.

Figure 1:
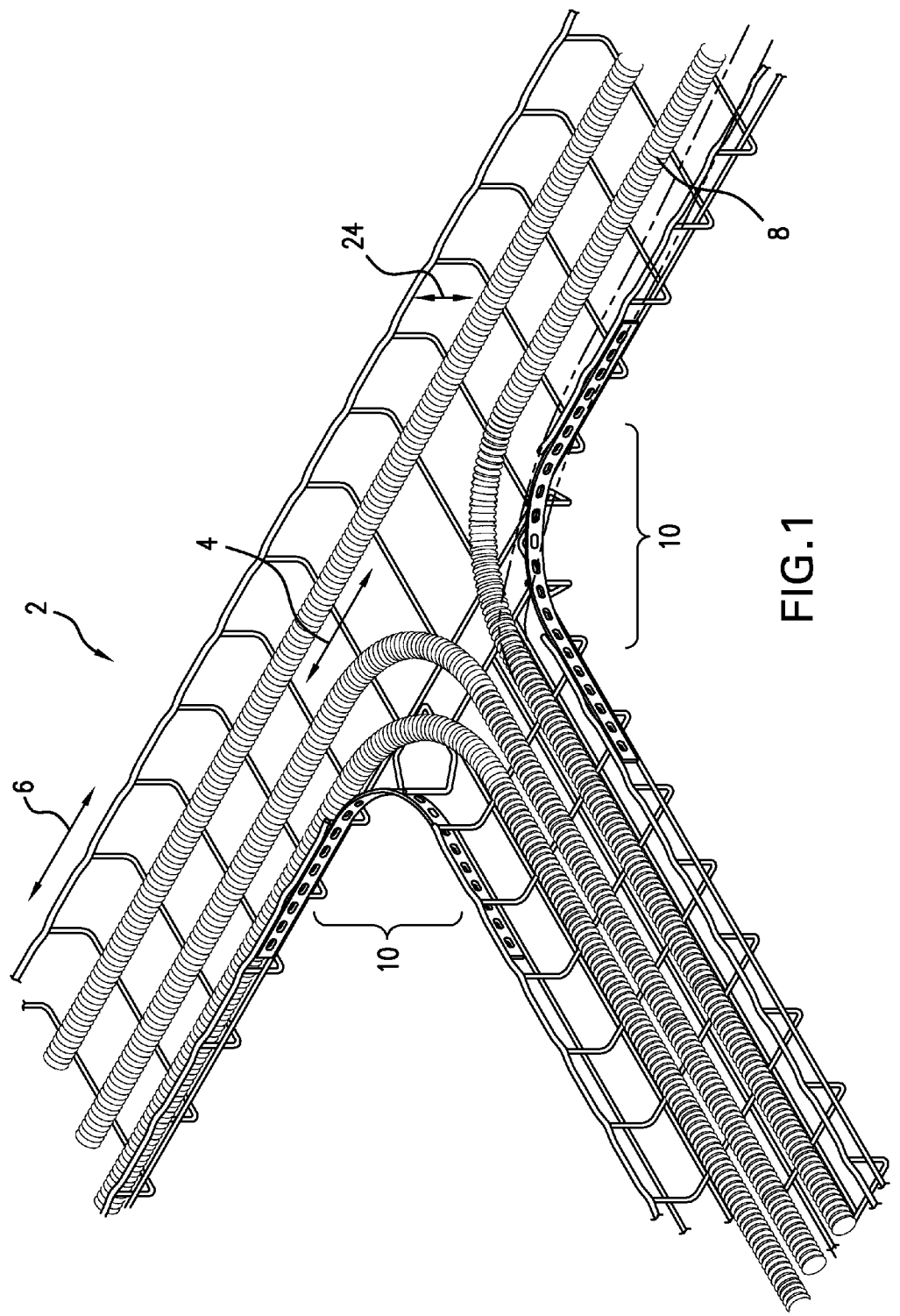
FIG. 1 is a perspective, topside isometric view of two corner areas of a support tray with cables disposed therein. The support tray shown in FIG. 1 does not include a retention device affixed to either corner area of the support tray.
Figure 3:
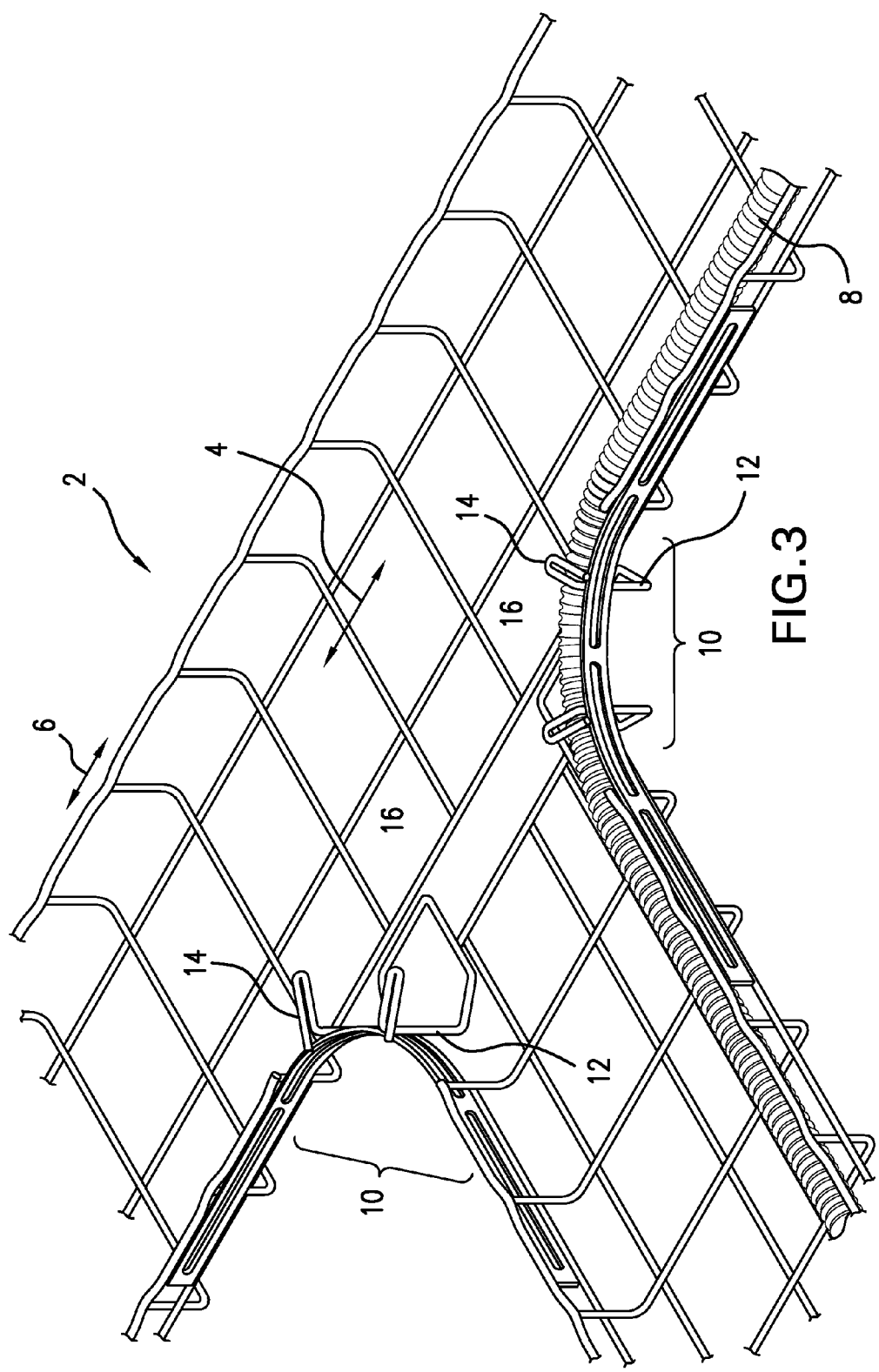
FIG. 3 is perspective, topside isometric view of two corner areas of a support tray with a cable disposed therein. The support tray shown in FIG. 3 includes a retention device affixed to both corner areas of the support tray.

Referring to FIGS. 1 and 3, the devices generally comprise a support tray 2 having a bottom plane 4 and top plane 6, whereby the tray is adapted to support the article 8. The tray may consist of a solid sheet of material, which is effective to create a surface on which the article may be placed. More preferably, however, the tray will comprise a wire mesh, which includes a grid of intersecting wires to form the surface on which the article may be placed. The use of a wire mesh tray (as shown in FIGS. 1 and 3) is preferred insofar as such trays require less material to manufacture and exhibit less mass (making installation easier). In other embodiments, the tray may consist of a ladder-type tray. In addition, the support tray 2 will preferably include a lip or retaining wall, which will be of sufficient height 24 to retain the articles when in a resting position (i.e., when pulling forces are not being applied to the articles). The top plane 6 mentioned above will be tangential with the top surface of the lip or retaining wall, whereas the bottom plane 4 will be tangential with the surface of the support tray 2 on which the article 8 will rest.

Figure 2:
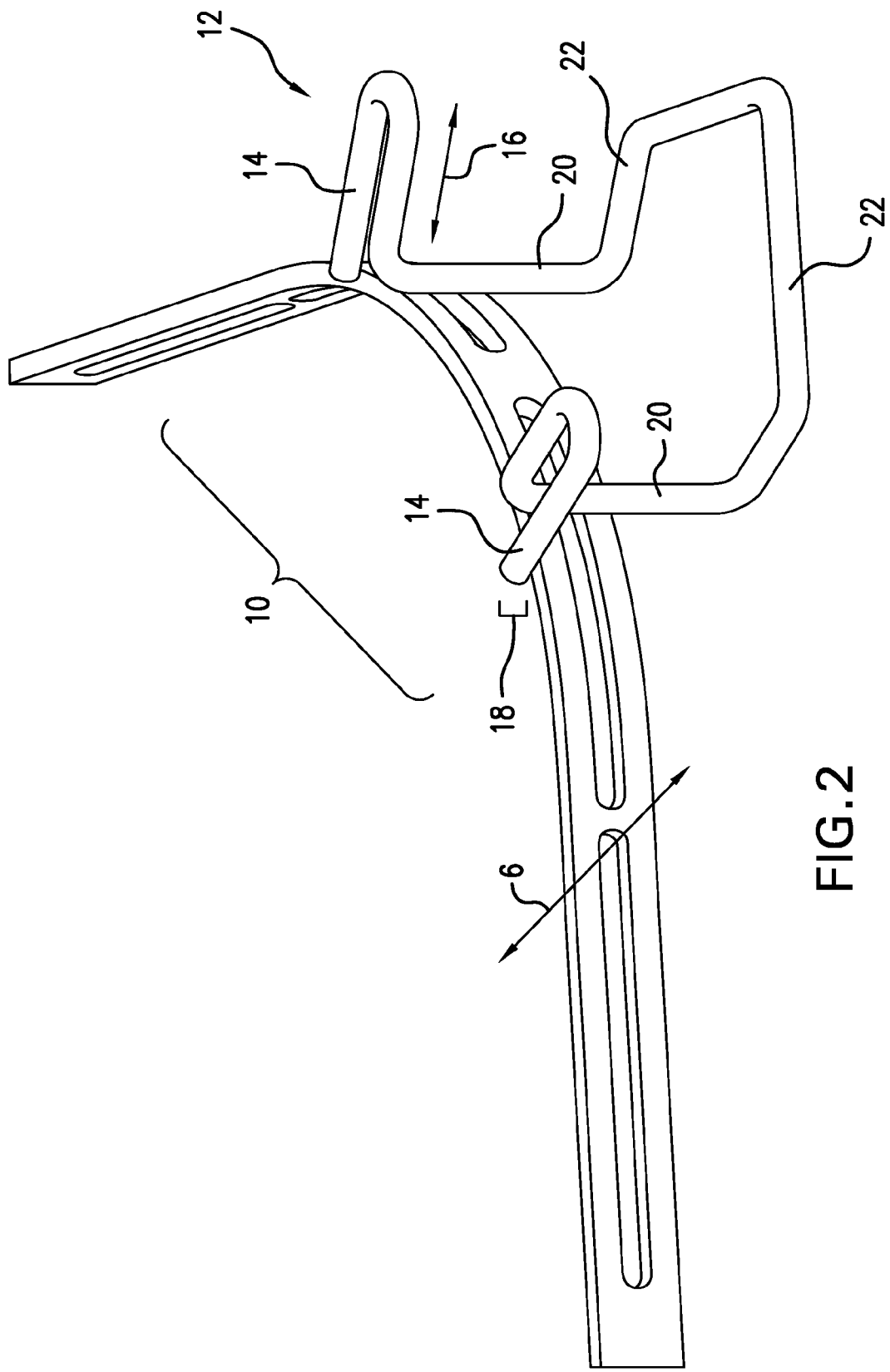
FIG. 2 is a perspective, topside isometric view of a retention device.

The tray will include at least one corner area 10, but may include many separate corner areas 10. According to these embodiments, and referring to FIGS. 2 and 3, the devices will further include a retention device 12, which is affixed to or integrally formed with the corner area 10. The retention device 12 will preferably include at least one protrusion 14 which extends from the corner area 10 into an interior portion 16 of the tray. According to certain embodiments of the invention, the protrusion 14 of the retention device 12 is substantially parallel or, more preferably, is parallel with the top plane 6 of the support tray 2. In addition, the invention provides that the protrusion 14 of the retention device 12 may be positioned below, in alignment with, or above the top plane 6 of the support tray 2. Referring to FIG. 2, for example, the protrusion 14 is positioned slightly above 18 the top plane 6 of the support tray 2, such as about 0.1 to 5 mm or, preferably, about 3 to 4 mm above the top plane 6. According to other embodiments of the invention, the protrusion 14 may be below or above the top plane 6 of the support tray 2, such as no more than 25 mm below or above the top plane 6 or, preferably, no more than 15 mm below or above the top plane 6. When the protrusion 14 is in alignment with the top plane 6, the protrusion 14 is neither below nor above the top plane 6, but rather is positioned within the top plane 6.

The invention further provides that, in certain preferred embodiments, the retention device 12 comprises two protrusions 14. In other alternative embodiments, the retention device 12 comprises a single protrusion 14, or three or more protrusions 14. The retention device 12 may be configured to be permanently or reversibly affixed to the support tray 2. For example, the retention device 12 may be welded or bonded (e.g., using adhesives) to the support tray 2 or, alternatively, the retention device 12 may be mechanically affixed to the support tray 2 using hooks, snaps, tongue-and-grooves, or other mechanical fasteners. Still further, the retention device 12 may be integrally formed with the support tray 2, such as with the lip or retaining wall of the support tray 2.

According to certain embodiments, retention device 12 comprises two protrusions 14, with the entire retention device 12 consisting of a single, contiguous, bended or molded wire. Referring to FIG. 2, according to such embodiments, each retention device 12 will preferably comprise a vertical support 20, which may form (or be positioned substantially parallel with) the lip or retaining wall of the support tray 2. In addition, the retention device 12 may include a horizontal support 22 that is preferably positioned to be substantially parallel or, more preferably, parallel to the bottom plane 4 of the support tray 2.

The invention provides that the retention device 12 and, more specifically, the at least one protrusion 14 will be effective to prevent articles 8, such as telecommunication cables, power cables, and other items, from being pulled over the corner area 10 of the tray during installation (e.g., when pulling or tugging forces are applied to such cables). FIG. 3 provides an illustration of the retention device 12 preventing a cable (article) 8 from being pulled over the corner area 10. The invention provides that, according to certain embodiments, the support tray 2 includes multiple corner areas 10, whereby each corner area 10 is provided with its own retention device 12—or a plurality of retention devices 12.

The devices of the present invention are preferably used to hold and suspend the articles, such as telecommunication cables, power cables, and other items, within the ceiling of a building, or otherwise near the topside of a wall (which may or may not be located above a ceiling line). The invention provides that a plurality of the devices described herein may be attached to the topside of a wall, such that the devices will collectively serve to support and suspend the cables near the topside of the wall throughout a building—either the interior or exterior portion of such building.

The devices described herein may be constructed of any suitable material. For example, the devices may be constructed of stainless steel, aluminum, other metals or alloys, plastics or other polymers, or combinations of the foregoing. In addition, the present invention provides that the devices described herein may be secured to a wall using screws, nails, adhesives, or other fastening means or, in certain cases, may utilize a gravity force to stability the support trays described herein on or near the topside of a wall.

According to another aspect of the present invention, methods for supporting, suspending and retaining an article within a building are provided. More particularly, methods for supporting, suspending and retaining telecommunication cables, power cables, and other items within a building are provided. Such methods generally comprise attaching a support tray to a wall. The support tray will preferably include a bottom plane, a top plane, and at least one corner area, but may include numerous corner areas. The methods further comprise providing the support tray with a retention device. As described herein, the retention device is preferably affixed to or integrally formed with each corner area of the tray, and includes at least one protrusion which extends from the corner area into an interior portion of the tray. The methods further include placing or installing the articles, directly or indirectly, on the tray, whereby the retention device is effective to prevent the articles, such as telecommunication cables, power cables, and other items, from being pulled over the corner area of the tray during installation thereof.

According to additional aspects of the present invention, kits are provided that may be used to construct the devices and/or carry out the methods described herein. For example, a kit encompassed by the present invention may comprise a plurality of the devices described herein (and/or components thereof), such that a series of the devices may be applied to a wall, and used to suspend cables.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. A device for supporting an article within or outside of a building, which comprises:
   (a) a wire mesh support tray having a bottom plane and a top plane, wherein the tray is adapted to support an article and comprises at least one corner area; and
   (b) a retention device, which comprises a vertical support and is affixed to or integrally formed with the corner area, wherein the retention device comprises two protrusions consisting of bended or molded wire that are substantially parallel with the top plane, wherein each protrusion extends from the corner area into an interior portion of the tray.

2. The device of claim 1, wherein each of the two protrusions are no more than 25 mm below or above the top plane.

3. The device of claim 2, wherein each of the two protrusions are no more than 15 mm below or above the top plane.

4. The device of claim 3, wherein each of the two protrusions are no more than 5 mm above the top plane.

5. The device of claim 1, wherein the retention device further comprises a horizontal support that is substantially parallel to the bottom plane.

6. The device of claim 5, wherein the tray comprises multiple corner areas, wherein each corner area comprises a separate retention device.

7. The device of claim 6, wherein the article is a plurality of telecommunication cables, power cables, or a combination thereof.

8. A device for supporting an article within or outside of a building, which comprises:
   (a) a wire mesh support tray having a bottom plane and top plane, wherein the tray is adapted to support an article and comprises multiple corner areas; and
   (b) multiple retention devices, whereby each retention device is affixed to or integrally formed with a single corner area of the support tray, wherein the retention device:
      (i) comprises two protrusions which extend from the corner area into an interior portion of the tray, wherein each protrusion is substantially parallel with, and is positioned 1-2 mm above, the top plane of the support tray;
      (ii) consists of a single contiguous piece of wire;
      (iii) comprises a vertical support; and
      (iv) comprises a horizontal support that is substantially parallel to the bottom plane of the tray.

* * * * *